(12) United States Patent
Brandwijk

(10) Patent No.: US 10,445,963 B2
(45) Date of Patent: Oct. 15, 2019

(54) TRADE FACILITATING SYSTEM

(71) Applicant: A.Q.B. Venture Capital B.V., Bilthoven (NL)

(72) Inventor: Arie Quirinus Bastiaan Brandwijk, Bilthoven (NL)

(73) Assignee: A.Q.B. VENTURE CAPITAL B.V. (NL)

( * ) Notice: Subject to any disclaimer, the term of this patent is extended or adjusted under 35 U.S.C. 154(b) by 253 days.

(21) Appl. No.: 15/552,322

(22) PCT Filed: Feb. 11, 2016

(86) PCT No.: PCT/NL2016/050102
§ 371 (c)(1),
(2) Date: Aug. 21, 2017

(87) PCT Pub. No.: WO2016/130010
PCT Pub. Date: Aug. 18, 2016

(65) Prior Publication Data
US 2018/0040185 A1 Feb. 8, 2018

(30) Foreign Application Priority Data
Feb. 11, 2015 (NL) ..................................... 2014277

(51) Int. Cl.
*G06C 9/00* (2006.01)
*G07C 9/00* (2006.01)
(Continued)

(52) U.S. Cl.
CPC ......... *G07C 9/00912* (2013.01); *G06Q 10/08* (2013.01); *G06Q 30/06* (2013.01);
(Continued)

(58) Field of Classification Search
CPC ............ G07C 9/00912; G07C 9/00309; G07C 2009/00412; G06Q 10/08; G06Q 10/0832;
(Continued)

(56) References Cited
U.S. PATENT DOCUMENTS 6,344,796 B1 * 2/2002 Ogilvie ................ A47G 29/141
340/5.2
6,480,758 B2 * 11/2002 Stevens ................ A47G 29/141
700/237

(Continued)

FOREIGN PATENT DOCUMENTS

WO 03040979 A1 5/2003

*Primary Examiner* — Michael Collins
(74) *Attorney, Agent, or Firm* — Aeon Law, PLLC; Adam L. K. Philipp; David V. H. Cohen

(57) ABSTRACT

A trade facilitating system based upon a physical transfer of objects, in which trading is to take place such that at least one object is transferred from being under control of a provider to being under the control of a receiver. The system includes a computing system, at least one trade facility having a secured space with physical access restrictions to the secured space, a series of deposit containers inside the secured space, a transport system inside the secured space, the transport system provided for retrieving an object out of a deposit container, transporting the retrieved object within the secured space to another deposit container, and depositing the object inside the other deposit container.

19 Claims, 3 Drawing Sheets

(51) Int. Cl.
  *G06Q 10/08* (2012.01)
  *G06Q 30/06* (2012.01)
  *G06Q 20/40* (2012.01)

(52) U.S. Cl.
  CPC ..... *G07C 9/00309* (2013.01); *G06Q 10/0832* (2013.01); *G06Q 10/0836* (2013.01); *G06Q 20/401* (2013.01); *G06Q 30/0609* (2013.01); *G07C 2009/00412* (2013.01)

(58) Field of Classification Search
  CPC .. G06Q 10/0836; G06Q 20/401; G06Q 30/06; G06Q 30/0609
  USPC .................................................. 700/231–244
  See application file for complete search history.

(56) References Cited

U.S. PATENT DOCUMENTS

| | | | |
|---|---|---|---|
| 6,694,217 B2 * | 2/2004 | Bloom | G06Q 20/00 700/215 |
| 9,733,647 B2 * | 8/2017 | Irwin | B65G 1/0485 |
| 2002/0156645 A1 * | 10/2002 | Hansen | G06Q 10/08 705/333 |
| 2005/0075989 A1 | 4/2005 | Biasi et al. | |
| 2013/0262276 A1 * | 10/2013 | Wan | G06Q 10/00 705/28 |
| 2014/0052661 A1 * | 2/2014 | Shakes | G06Q 10/0836 705/339 |
| 2016/0086418 A1 * | 3/2016 | Smolen | G07F 9/006 700/237 |
| 2017/0221059 A1 * | 8/2017 | Sethi | G06F 21/44 |

\* cited by examiner

TRADE FACILITATING SYSTEM

CROSS-REFERENCE TO RELATED APPLICATIONS

The present application is a National Stage Application of PCT International Application No. PCT/NL2016/050102 (filed on Feb. 11, 2016), under 35 U.S.C. § 371, which claims priority to Dutch Patent Application No. NL 2014277 (filed on Feb. 11, 2015), which are each hereby incorporated by reference in their respective entireties.

FIELD OF THE INVENTION

The invention relates to a trade facilitating system, and a method for facilitating for facilitating trade.

BACKGROUND OF THE INVENTION

Current methods of accessing a storage location of valuable objects primarily requires physical presence for security measures or for a person bringing a physical key that is required for opening the storage location. Besides a key other opening methods are known such as biometric methods and electronic methods such as entering a password at a keyboard. Current systems primarily require that such an action is occurring in person at such a location. Furthermore, in the direct vicinity of such a storage location performing parts of a trade is not allowed or the space is not equipped for this purpose. Access is also restricted in time.

An example is when accessing the area where one has rented a safe deposit box at a bank. Security measures enable only access to a small number of people to that area and potentially only to people who are related to a certain safe deposit box or something functionally alike and also related to that area. Thus either a receiver or a provider is allowed to enter that area and it is not common practice for them to do so both at the same time. A physical transferring of valuable stored objects in the traditional way cannot take place at that area since a receiver and a provider are not allowed to be present at the same time at that area. Besides access, such institutions are not equipped for validation or verification of the object as will be described later on. This is because there is no standardization on what objects are allowed to be in a safe deposit box. Current systems place responsibility of the contents of the box solely on the renter of that safe deposit box. Another problem exists when the change of ownership comprises one or more valuable objects having a large volume or may required specialized handling: that area is not equipped for those purposes. In most cases such access is also limited in duration and is not always possible. This may be the case when a bank is closed or access is provided on certain days or at certain times. In some cases an appointment needs to be made in case the bank protocol prescribes an employee to be present or to be performing certain actions. This may be the case since the area may provide access to storage locations of others that also may contain valuable objects; in that case only controlled or supervised access is allowed. This is mainly due to a form of risk management. In case of a depot at a bank for storing standardized forms of precious metals: a bank employee places items in the depot. Extraction of the items also occurs by a bank employee before the renter or owner, or the person having a proper power of attorney can get their hands on the items for making a trade at another location.

Thus administrative procedures, limited opening times of a bank, limited times for allowing a depot or safe deposit box to be accessed, mandatory reservations ahead of time for extracting or storing precious metals in a bank depot, physical restrictions (one may need to go to such a facility for providing a kind of key) are all problems amongst others which limits a renter of such spaces in their freedom to make a transaction that for instance involve the objects stored in such a safe deposit box. Due to a decreasing number of actual branches of a bank or changing locations of these branches or due to termination of their safe deposit renting service by banks or at bank branches, the ability to rent a safe deposit box at banks has diminished. This even increases the problem: the travel distances to a marketplace for an object and for the parties involved grow.

These and other mentioned aspects may be applicable to all known kinds of secure storage areas or locations for storing valuable objects. The above mentioned problems or situations may also at least in part be problems of other known facilities providing storage for valuable objects or be part of a combination thereof.

Since the history of man, people use various objects for trading or for bartering. For payment and clearing debts, objects and material like salt, tulip bulbs, mirrors, seashells and beads were used. These objects thus represent units of value, act as a means for exchange, are used to store value or to transfer value, or are used as a standard of deferred payment. An example of such a payment standard is 'fiat currency', which derives its value from government regulation or law. Another example of a payment standard is the 'gold standard'. This is a monetary system in which the standard economic unit of account is based on a fixed quantity of gold; a kind alike system based upon a (valuable) material is a 'silver standard'. Various other standards or backings of a currency are possible and may be implemented in the future, for example by using 'rare' earth materials. All these units of value depend on trust: What do people consider to be of value, how does that attribute to these backings or standards of value, how are they regulated and used, and are these backings of value exchangeable. Money may fulfil some of these functions at different times, at different places and under certain circumstances. Money may be of a physical form, or it may for a large part be in an electronic form.

Before the electronic form of money, portability of money has for long time been an important aspect of money. Money is based upon the faith or trust by multiple users that this money can be exchanged into other objects of real value in daily life, but which are more bulky. For instance objects like food, clothing, shelter, etc. When examining the history of money, goldsmiths often play an important role. A brief characterization will follow and describe parts of that role.

Goldsmiths made trade easier by making coins of precious metals like silver or gold in standardized units. The weight and purity of these coins were certified. In order to protect the goldsmith's gold, vaults were used. A goldsmith rented space in these vaults that were under the goldsmith's control to others for storing and safeguarding their coins, precious metals and valuable items. Depositors rarely withdrew their actual physical coins or gold from the vaults and when depositors did, they did not withdraw all at the same time. This was because the goldsmith gave depositors a claim or claim check in writing. Such a claim check guaranteed that the holder of such a claim check could get back the deposit that was written in the claim. In turn, this resulted in claim checks being used and exchanged when making an actual trade transaction at for instance a physical market place. The goldsmith was not directly involved in order to make such a trade.

An important change came when the goldsmith loaned the physical available deposits of depositors to borrowers in the form of claim checks. For providing these deposits, depositors in return received a form of interest on their deposits. The loans to the borrowers were priced a higher interest rate in comparison to the interest rate given to the depositors. The difference between the received and the paid interest rate functioned as a compensation for costs and provided profit for the goldsmith. The interest rate that the depositor received may have been a composition that partly related to the profit made because the depositor's deposits was loaned out to borrowers and that partly related to the depositor paying the goldsmith for providing safe storage of the deposits. These parts may have been separate money flows, or the storage part may have been omitted from the composition. A first form of a banking system was thus created.

Another important further change came when the goldsmith or banker issued more loans to borrowers, read issued more claims on gold, than physical counter value deposited in the goldsmith's vaults. Depositors did not know or did not care that there were more loans than the deposits could guarantee, probably as long as they got their interest paid.

This kind of leverage, called 'fractional reserve banking', may work until a large number of depositors withdraw their deposits from a bank within a very short period of time: this is called a 'bank run'. This may occur for various reasons, but mainly this is due to a lack of trust or faith regarding the bank. Also a lack of trust or faith regarding the political or financial climate within one of the countries wherein the bank is operating in may be sufficient reason for a bank run. The bank for instance may have financed companies with loans, and these companies may not be able to return the loan or even not be able to pay the interest. Even a perception or anticipation based on false or incomplete grounds may be sufficient to distrust a bank. The same may hold true for financial products provided by the bank or for loans provided to countries.

Several crises have arisen lately, for example the 'subprime mortgage crisis' resulting in a global financial crisis starting in 2008, and the 'European debt crisis' wherein countries like Greece and Ireland were hit severely. In these crises, several bank runs have occurred: US firm Countrywide Financial in August 2007, British bank Northern Rock on 13 Sep. 2007, global investment firm Bear Stearns on 11 Mar. 2008, US mortgage lender IndyMac Bank on July 2008, US firm Washington Mutual in September 2008, US bank Wachovia on 26 Sep. 2008, Icelandic bank Landsbanki on 6 Oct. 2008, and in October 2009 DSB Bank in the Netherlands.

Central banks of nations or 'system banks' experience more and more difficulties in resolving or preventing (potential) bank runs, since banks and bank clients operate globally instead of only nationally. Additionally, nations may work together under a single currency. A further stop down the road is when countries go bankrupt, called defaulting. This happened for example to post-second-world-war Germany, to Argentina in 1999, and most recently to Cyprus in 2011. The default of a nation or group of nations also affects the currency they use. It has effects on prices of imported or exported goods and services. Financial confidence in banks and in countries has been in decline at least since 2008.

The current use of fiat money has no backing of a physical commodity. Money creation nowadays occurs by banks. They bring new money into the economy or create money as they make out loans: money as debt.

Banks make use of a principle called the 'leverage principle'. A leverage ratio of 4% for example means that for every 1 item of capital (or unit of value) a bank holds in reserve, the bank can lend 25 items of capital to others ($1/25=4\%$). After the start of the global crisis in 2008, there has been a trend towards raising the required leverage ratio for banks. This is specified in the Basel III agreements.

Banks and governments do not guarantee more than a certain amount of deposited money at a bank to a depositor. After the G20 meeting in Brisbane 2014 however, the G20 nations consider the remaining deposit amount to be a paper investment into the bank. Thus a bail-out of a bank by a central bank or a nation became a bail-in of a bank by depositors assets. Such guarantees of a limited deposit amount deposited by banks are part of so-called deposit guarantee schemes.

These deposit guarantee schemes do not take into account the probable lower currency value in comparison to other currencies when a bank defaults. Only the amount in the used currency is guaranteed. It remains to be seen whether these kind of guarantees can be upheld when a global crises of confidence occurs.

In order to lower the risk of being part of a bail-in or of being part of a default of one or more financial system elements, a depositor may take measures for a part of their deposits or for a part of their paper currency. A solution is to exchange part of one's deposits or paper currency into other assets that are not under the control of the bank or that are not part of a monetary system. These assets however remain under the control of a nations law and regulation system. Such an asset or assets may be stored in a kind of safe deposit box at home, or at a bank or at a storage facility providing a secure space or depot. In case of a bank, this does not always guarantee access during a bankruptcy of a bank. Access may for instance be restricted for a longer period of time. In case such an asset is stored at home, the owner may have to deal with several risks for instance burglary, robbery or fire. These risks not only are of importance to the assets, but more importantly to the safety of people in and around the house.

When converting or exchanging deposits or money into assets that are not part of a monetary system, it is desirable that some or all of the principles which are applicable to money will for the large part be maintained or even be enhanced. These principles are for instance: acting as a measure of value, acting as a medium of exchange, acting as a store of value, action as a transfer of value or acting as an accepted method of payment. These principles are preferably applicable to assets outside of the monetary system as well, especially when making a trade wherein at least a part of the ownership or holdership of the subject of the trade changes.

Current safe deposit systems are set up from a perspective of safe storage of valuable objects. In these systems, trading is not an easy option or may not even be possible. These safe deposit systems thus do not contribute in a positive manner and do not apply the principles or preconditions for money that allows money to function.

SUMMARY OF THE INVENTION

The invention solves at least one problem wherein several aspects applicable to money are being maintained and enhanced and wherein procedures and the invented system may replace the trust placed in banks, in electronic money and in secure storage systems for valuable objects.

The invention thus provides a trade facilitating system based upon a physical transfer of objects, wherein for trading to take place at least one object is transferred from being under the control of a provider to being under the control of a receiver, said system comprising at least one trade facility, said trade facility comprising:

a secured space comprising physical access restrictions to said secured space;

a series of deposit containers inside said secured space, comprising a first deposit container assigned to said provider and a second deposit container assigned to said receiver;

a transport system inside said secured space, said transport system adapted to retrieve said object out of a deposit container, to transporting said object within said secured space between deposit containers, and to deposit said object inside a deposit container;

a computer system, adapted to control said transport system in response to provider input data from said provider and receiver input data from said receiver, said computer system comprising data functionally coupling said provider to a first deposit container and said receiver to a second deposit container, and machine instructions which, when executed by said computer system, cause said computer system to:

receive provider input data comprising a provider-specified quantity of objects, an authorization from said provider to retrieve said provider-specified quantity of objects from said first deposit container, and an indication identifying said receiver;

receive receiver input data comprising a receiver-specified quantity of objects, an authorization from said receiver to deposit said receiver-specified quantity of objects from said first deposit container, and an indication identifying said provider;

compare from said provider input data and from said receiver input data said quantities of objects, and said provider indicated receiver with said receiver indicated provider;

verify said authorizations;

if said comparing indicates matching quantities of objects, a matching provider and matching receiver, and if said authorizations are verified, then said computer system:

controls the transport system for retrieving from said first deposit container the provider-specified number of objects;

controls the transport system to transport the retrieved objects to the second deposit container, and controls said transport system for depositing the retrieved objects into the second deposit container.

The invention further relates to a method for facilitating trade, said method comprising transferring at least one object from being under the control of a provider to being under the control of a receiver, said method comprising providing:

at least one trade facility comprising a secured space comprising physical access restrictions to said secured space;

a series of deposit containers inside said secured space, comprising a first deposit container assigned to said provider and a second deposit container assigned to said receiver;

a transport system inside said secured space, said transport system adapted to retrieve said object out of a deposit container, to transporting said object within said secured space between deposit containers, and to deposit said object inside a deposit container;

a computer system, adapted to control said transport system, said computer system comprising machine instruction for causing said computer system to:

receive provider input data comprising a provider-specified quantity of objects, an authorization from said provider to retrieve said provider-specified quantity of objects from said first deposit container, and an indication identifying said receiver;

receive receiver input data comprising a receiver-specified quantity of objects, an authorization from said receiver to deposit said receiver-specified quantity of objects from said first deposit container, and an indication identifying said provider;

compare from said provider input data and from said receiver input data said quantities of objects, and said provider indicated receiver with said receiver indicated provider;

verify said authorizations;

if said comparing indicates matching quantities of objects, a matching provider and matching receiver, and if said authorizations are verified, then said computer system:

controls the transport system for retrieving from said first deposit container the provider-specified number of objects;

controls the transport system to transport the retrieved objects to the second deposit container, and controls said transport system for depositing the retrieved objects into the second deposit container.

The invention further relates to a computer program product for facilitating trade, said trade comprising transferring at least one object from being under the control of a provider to being under the control of a receiver, said computer program product comprising machine instructions which, when running on a computer system, causes said computer system to perform the above-referenced method.

In the current context, a trade transaction is to include bartering, but also providing an object as a gift.

The trade facility can be a separate building. The trade facility can also be part of an existing building or structure. For instance, part of a shopping mall can be provided with a secured space. This, that part of the shopping mall becomes a "trade facility" within the meaning of the current invention.

The secured space comprises physical access restrictions to said secured space. These physical access restrictions in general are provided to keep human beings outside the secured space. This also relates to provisions intended for keeping objects out of the secured space that are not authorized. For instance, persons wanting to gain unauthorized access to the secured space may use devices like flying drones, guided vehicles, and the like in order to gain access to the secured space. Usually, a physical access restriction can be a wall, a fence, a roof. Physical access restrictions may also relate to other measures that are intended to prevent access to the secured space. For instance, the restricted space may be within a Faradays cage, preventing electromagnetic signals from entering the secured space. The physical access restrictions may also relate to a corridor around the secured space in which an electromagnetic pulse travels or is induced, or in which an ultrasound pulse is generated which prevents a human being to be in the corridor.

The invention relates to a quantity of objects. This comprises "number" of objects. When an object is for instance a bar of gold or a coin of gold, "number" usually has the regular meaning. An object can also be for instance material like gold in a powder form. In such a situation, "number" refers to the amount of powder, usually expressed in weight.

The "object" may in situations also be in a liquid form. Then again, "number" usually refers to the amount, usually expressed in weight, but volume may also be possible. In relation to trade, quantity may also relate to the value of an object.

The transport system is provided for transporting objects. Usually, the transport system relates to a system that is provided for retrieving an object from a deposit container, transport the object to another deposit container inside the secured space, and place the object inside that other deposit container. In an embodiment, the transport system is provided to displace deposit containers inside the secured space. In extreme, one deposit container is transported to another deposit container. The deposit containers in an embodiment can be mutually placed that an object can be slided from one deposit container to the other deposit container. Alternatively or in combination, one or more of the deposit containers are provide on a carousel.

In an embodiment, the transport system comprises a robot system. Such a robot system can in an embodiment move freely through the secured space.

The computer system of the trade system can relate a single computer. The computer system may also relate a series of actual computers that are integrated into one system. These computers then usually share a data connection. They usually are functionally coupled in order to work together. These computers can form a distributed system. Parts of the computer system may thus be provided at different physical locations. The differ parts of the computer system may for instance be provided outside the facility, on the facility, within the secured space, in or at the deposit containers, at or on the transport system, and the like.

The computer system is adapted to control the transport system. Such control can relate to providing machine instructions to the transport system. This may also means managing operation of the transport system. In a sense, this may relate to steering the transport system. In order to control the transport system, the computer system and the transport system may be functionally coupled. In order to provide an additional security to the system, the computer system and the transport system are physically coupled. For instance, data transfer may take place via hard wiring, via a wired coupling.

In an embodiment, the trade system further comprises an administrator, wherein said computer system is provided for using authorization related to said administrator, and wherein said computer system is further provided for receiving an authorization from said administrator.

In an embodiment, the computer system is adapted to share one or more secrets with said receiver for generating authorization keys, adapted to share one or more secrets with said provider for generating authorization keys In an embodiment, the computer system is further adapted to verify the availability in a deposit container of said quantity of objects to be transferred before retrieving and/or transporting.

In an embodiment, a series of different authorization codes is needed and wherein each authorization code is representative for a different part of the trade.

In an embodiment, for opening a deposit container a different authorization key is required than for use in a trade.

In an embodiment, the number of objects comprises a quantity of specifically specified objects.

In an embodiment, the number of objects comprises a quantity of standardized objects.

In an embodiment, the computer system receives an authorization code relating to a certain physical property, and translates said authorization code into a number objects representative of that physical property.

In an embodiment, the deposit containers are part of said transport system.

In an embodiment, the provider and said receiver are different parties of different entities.

In an embodiment, the computer system is at least partly provided remotely from said facility, and is provided for receiving authorization remotely from said facility.

In an embodiment, the authorization comprises authorization keys. In particular the authorization keys are electronic authorization keys. In an embodiment, the authorization keys are digital keys. In an embodiment, the authorization keys comprise a physical part.

The trade system of any one of the preceding claims, wherein said trade system uses a cryptographical method.

In an embodiment, the secure space comprises walls defining said secure space.

In an embodiment, the secure space comprises a maintenance access.

In an embodiment, the secure space comprises an object delivery access.

In an embodiment, the deposit containers comprise a partial physical enclosure.

In an embodiment, the deposit containers comprise a physical entrance, and an enclosure defining an enclosed space.

In an embodiment, the computer system is distributed, comprising a computing device functionally coupled to a deposit container, in particular provided inside a deposit container.

In an embodiment, the computer system is distributed, comprising a computing device functionally coupled to a secured space, in particular provided inside said secured space.

In an embodiment, the computer system comprises secrets shared with said administrator, with said provider and with said receiver.

In an embodiment, the access to a deposit container requires an authorization of the administrator.

The invention further relates to a secured space and/or a transport system for use in a trade facilitating system described in tis document.

The facility comprises SToring and Ownership Right Transfer of Objects, we further label this kind of facility in the description a STORTO-facility. By mentioning this STORTO-facility, part of the providing services that are described below may alternatively be meant by this label in whole or in part.

A change in the ownership right of an object occurs when a trade is being made and the provider is providing the object whereby the receiver is receiving the object. This may occur direct or indirect and in either case it can be provided or facilitated by an intermediate party and related to the administration of a STORTO-facility. Direct or indirect change in the ownership right regarding an object depends on how the change of ownership is defined and executed; this may encompass legal definitions or may have legal implications or procedures.

By the administrator is meant a person, group of persons, a company/institution, a group of companies/institutions, a nation, a group of nations or a combination thereof in direct or indirect service of a STORTO-facility and providing a certain degree of administrator functionality or other services for a STORTO-facility. The administrator does not need to be the owner of a part or of a whole STORTO-facility. In this sense also an administrator part of the administration relates to the previous.

Various persons may attribute various values to an object. Defining the value of an object depends on what other people are willing to sacrifice in order to have a certain degree of control over that object. In current society a higher value is attributed to for example gold, silver or diamonds than to sand. In contrast, when for example being in the middle of a low populated area of the desert, bottled water may be a scarce commodity and therefor be regarded as a valuable object. The current invention defines a physical object as an object of value to others. This physical object may be part or not be part of a 'fiat currency' system. In an embodiment of the invention, the physical object is not part of a 'fiat currency' system that is not backed by or related to a standard like for example a 'silver standard'. For applying the current invention it may be wise to use physical objects that have a low volume and a relative high value. This makes it more worth the investment to use the invention. In an embodiment, trade relates to a volume of material or to a mass of material.

A change in an ownership right of an object may be a trade or a transaction wherein a right is exchanged or wherein a legal title is changed or altered or wherein a certain change may have a similar influence upon the object in relation to a party. It may also relate to working in a barter system. A change of an ownership right may be related to the ownership right. If objects remain the property of for instance a government but trading with such objects is allowed this can also be seen as a form of change in an ownership right. The ownership right of the government allows other rights to be exchanged: in this case a trade or a use right. One may see this as the government not having all rights exclusively. The government may have distributed a certain part of all rights to others. Thus, the change in an ownership right encompasses also other rights such as rights of use even when one is not the actual owner. The main idea is that a certain right to an object is transferrable, for instance the holdership of an object. The term 'change in an ownership right' should thus here be interpreted in its broadest sense. A change in a use right may also be applicable to the term change in ownership. A mere 'power of attorney' may thus also be regarded as a form of a right. There may be aspects of rights that are limited in time. In this description the term change of ownership may be used as an abbreviation of the previous.

For a change of an ownership related right there may be more sides involved besides a provider and a receiver. Involvement of a party may occur before, during or after the change of an ownership right related to an object. Two involved parties are at least a provider and a receiver. Parties do not need to be involved at the same time; involvement may also be consecutively. Also parties may be involved for a short period of time in the timeframe before or during or after the change of an ownership right or of a combination thereof.

A change of ownership related to a received object may turn a receiver into a provider in case the receiver provides the received object to a further receiver. It should be clear that this receiver may have been a provider in a previous change of ownership of that object. The parties involved in the change of ownership of an object, i.e., the provider and the receiver, may be a person, a company or institution or even a nation or a combination thereof. The parties involved in the change of ownership may function as a renter of a deposit container or as an owner of a deposit container within a STORTO-facility or as a renter or owner of a part of a STORTO-facility itself. Such a party may function as a party enabling the providing of the object or the receiving of the object; enabling the transferring of the object may be a separate function. Such a party may have several functions or designations at the same time or at different times. A party may have a certain right to an object stored at a location within a STORTO-facility. A right may be a partial or shared right. A party may be designated as a seller or as a buyer. A party may be a trader by profession of certain objects. A party must have a certain authority to be able to fulfil its role. This may for instance be effectuated by paper or electronic documents or by electronic security measures. The used terms or designations may be in relation to the kind of change in an ownership right that occurs or is in place before or after that change.

Different levels of security or levels of authority for different actions, authorities or functions can be given to a party. Parts of these levels of authority may overlap. Parts of allowed actions or procedures derive their allowance based upon what kind of ownership rights are applicable to an object or to what kind of rights are applicable to a party.

In an embodiment, the action of the providing leading up to the receiving may comprise a certain period of time or length of time. The object may also physically move or displace when a trade transaction takes place. In case there is no movement or displacement aspect in said action this may be due to no need or whish for the receiver to have the object repositioned. The following will describe examples on how the receiver is able to have a certain span of control over the object. This is difficult when the object is at a location within a STORTO-facility and for a part under the control of the provider. For that reason that span of control may physically be taken away from the provider. This may mean that an object is first stored at an intermediate location or intermediate deposit container within the STORTO-facility. After certain conditions are met, the object is transferred to a location within the STORTO-facility that is under the control of the receiver. When conditions are not fulfilled or met, this may mean that the object is transferred back to the location or deposit container related to the party who was intending to provide the object. Determination on whether or not a condition is met may be done by the administration of the STORTO-facility or by a third party. Using such a third party may be set up is a way that is similar to how financial escrow accounts function. Alternatively, this function may be assigned to the computer system. Obligations or trades then may have a part in the procedure that comprises a kind of reserved status for an object that is subject to a trade. For instance, the provider in the mean time cannot do anything else with the object, while the receiver on the other hand is guaranteed that the object is actually physical available for a change of ownership and can be provided by the provider.

Another option is that the change of ownership of the object is executed without the need for an intermediate storage location or intermediate deposit container: the object can be transferred from the storage location or deposit container under control of the provider to the storage location or deposit container under control of the receiver. This may be viewed as a direct trade. Another form of trade may occur when a right to a certain deposit container and its contents within a STORTO-facility are changing from a first party to a second party. This may be viewed as an implicit trade. Thus sometimes the object is legally changed in an ownership right without the object having an aspect of undergoing a physical displacement to another deposit container. In that case the object for instance needs to be seen or inspected by the second party.

Currently in the banking sector, these institutions do not wished to have any kind of responsibility or handling issues regarding the contents of a rented safe deposit box; thus a bank would not perform such an inspection or verification on behalf of a client. When making a trade frequently in the manner of changing a title to a safe deposit box, each time the bank needs to make the administrative changes. After a few times, it is likely the bank puts limits on their cooperation with regularly changing one's renting title to others. Now with new technological means, such as a visual inspection (aided by for instance digital cameras), part of a verification, authentication or alike may be performed and may give a party sufficient grounds to make a decision regarding the object.

In an embodiment, a robot system is provided for taking the object out of storage and using for instance a camera system so that the object may be remotely viewed. A camera may provide photos or video even in real-time and using different parts of the electromagnetic spectrum, such as infrared, or combinations thereof. The camera may also provide sound. In an embodiment, the robot system may go to the corresponding deposit container and place a camera inside that deposit container for that same purpose. This may even be done without opening the deposit container in full, but by using a kind of camera slot to put the camera in. Another implementation is that the interior of the deposit container is being equipped with camera functionalities. These implementations and combinations thereof may be in combined in different embodiments of the invention. In an embodiment, the robot system is part of the transport system.

The last two camera-related embodiments of the invention may give additional information that is not desired by the provider of the object. For instance, information may be provided regarding other objects that are stored at that deposit container, or the lack of other objects at or in that deposit location. This, for example may be used by the receiver as a kind of 'credit' valuation of the provider. For those and other reasons, a party may prefer the physical taking out the object of a deposit container. When this part is subsequently provided in a secure area in the secured space, a robot computer system may be performing this action of evaluating and physically taking out the object.

The physical marketplace is in part situated at the STORTO-facility, in an embodiment in particular in the secured space. This part encompasses the part of the trade related to the physical transport of the object being subject to a change in ownership right. As will be explained later this part of the trade also does not require a physical appearance of the actual provider or receiver at a STORTO-facility. This method has the advantage that a buyer and a seller do not need to take the object in and out of the STORTO-facility when making trades with the object. The portability of these objects is no longer an issue for a trade. This has a positive aspect on the time it takes for a trade to be accomplished. Timing or having the change of ownership occurring within a short period of time may be an important aspect of trade. In this manner trades may occur more frequently.

In the invention, the distance aspect is in principle limited to the size of a STORTO-facility. This lowers potential transport costs and security costs accompanied with a transport from a STORTO-facility or from a first deposit container to an external marketplace and from the external marketplace back to the STORTO-facility or back to the first deposit container or to a second deposit container. This may also be hazardous to the persons involved in the transport and security of the object(s). The objects are presumed to be valuable objects, otherwise there is no need to store the objects at a place that is considered safe and secured. In case such a trade incorporating valuable objects takes time, usually additional temporary storage and security costs and measures may need to be taken before the trade occurs. These costs are related to a certain object or group of objects and do not have the economies of scale when compared to a STORTO-facility and how STORTO-facilities may operate.

Part of the marketplace becomes a secure marketplace within a STORTO-facility in the sense that physical security measures are in place related to the STORTO-facility; these are besides the security measures on how a trade is being executed or proceeds within a STORTO-facility.

An additional advantage to the current invention is that a party does not have to physical come to that secure marketplace. Using electronics and cryptography methods allow for a party to remain remote when being involved in the transfer of an ownership right of a physical object. A party using, from a remote location, a device that uses security measures and which communicates to a STORTO-facility or to the computer system related to a STORTO-facility may for instance accomplish this. Known security measures and devices have been used by electronic banking methods. A party may do so at a convenient time and determined by that party. A trade may even be scheduled for a certain date and time.

In order to make the best use of a STORTO-facility, the object preferably has a relative high value per volume. Precious metals like gold, silver, palladium, and platinum or diamonds may fulfil that objective, depending on the market price or demand for those items. The market price for the stored objects may comprise a risk that is placed upon a provider or a receiver.

The invention may be extended in purpose, even beyond or next to the initial purpose of conversion of deposits, paper money or 'fiat currency'.

Sometimes the value exceeds the value per volume aspect, this may be the case for instances with art, paintings, jewellery, expensive watches, historic objects or rare objects or unique objects. Value may also be attributed in relation to the process which the object has gone through until reaching a certain stage. This may be the case for certain isotopes of elements or even a pharmaceutical or biological object or rare half-products or products. Museum objects or archaeological objects may also be applicable as well as biological objects like seeds of an extinct plant or like rocks from space. In that sense a STORTO-facility may have a purpose for a certain theme related to art, banking, biological, chemical, pharmaceutical, historical or cultural. This may have some consequences for the conditions in which objects are being stored, transferred, accepted or returned out of a STORTO-facility. Examples of the conditions are temperature, light conditions, moisture, air composition or shielding in case of radiation emitting objects.

In an embodiment, in the system for instance authenticity of an object is verified at the facility. In a further embodiment, the authenticity of an object is verified at or inside the secured space. Thus, in an embodiment a secured space comprises a verifying device. The verifying device in an embodiment is functionally coupled to the computer system. In an embodiment, the administrator of a STORTO-facility verifies the authenticity of the object being stored when accepting the object. Verification relates closely to authentication and sometimes even mingles. In an embodiment verification may encompass authentication. Verification or authentication may take place at a handling area or at other places related to a STORTO-facility or during a secure transport towards a STORTO-facility or even during the transportation phase or transfer into the secured space. Verification methods occurring outside the secured space may also be available inside the secured space. A robot then may physically perform steps or actions, which may have been executed otherwise by humans outside the secured space for that verification or authentication process. Verification or authentication may also occur in the secured space between the accessing of a deposit container in a STORTO-facility. No verification may be needed when the transporting of objects between STORTO-facilities is secure. Secure may mean that no damage can happen during transport to the object or may mean that the object is not switched with another object or additions or subtractions to and from the object is possible. To be short, the object's condition during transport does not change or changes within some allowed bandwidth. This is important for maintaining the object's value. When transport of an object after verification to or into a STORTO-facility is secure, the verification process may occur at another site prior to and in the vicinity of the start of the transport to a STORTO-facility. This then occurs in a controlled and secure manner. For some objects verification after a transport or transfer is required to exclude potential transporting damage to the object.

In an embodiment, when a provider wants to trade an object or a group of objects this process of verification may be required to take place. To this end, the verifying device is used. This verification is not needed when a provider only stores the objects, thus without the intention of trading or providing the object to others, although verification of objects may be done when an object enters the secured space. Another form of verification or authentication may be required to exclude the administrator related to a STORTO-facility for having made or being responsible for unacceptable damage at the object during its stay at that STORTO-facility. This kind of verification may occur when an object is entering or leaving a STORTO-facility. A provider or receiver of an object may request verification or authentication or objects related to them. This may enhance trust and transparency for the users of a STORTO-facility.

In an embodiment, parts of allowed actions or procedures are allowed based upon what kind of ownership rights are applicable to an object or to what kind of rights are applicable to a party. To that end, the computer system may comprise an indication of rights of entities coupled to entities that relate to deposit containers. Ownership rights of objects may differ from the rights to a rented location or rented deposit container. In an embodiment, when transferring an object from a provider to a receiver the administrator of a STORTO-facility may take these rights into account. The administrator may for instance request a clearance from the computer system. Alternatively, the computer system may check a trade transaction against stored rights for each entity and clear a trade action when allowed. The same is true for the withdrawal of an object from a (rented) location or the storing of an object at a (rented) location or for allowing the start of a verification or authentication process of an object.

The verification process thus may ensure that the object is verified and that it is validated that the object is what it is presumed to be. An object has a certain value and this is mainly due to its characteristics, its form, its volume, its weight, its material consistency, its purity, its composition or other aspects. The examples of objects characteristics and other characteristics may need to be taken into account when the transport system provides the transport for instance an object may have a fluid part. Depending on the object various verification methods may be applicable of which a part of these methods may be used. Verification processes are different for different objects. Experts know what object may need what process for verification or authentication. For instance, images from an object, for instance at visible light, but also for instance at UV or IR light, may be combined with one or more measurements of physical parameters, for instance weight or electrical conductivity.

The process may be based upon how the object or similar objects in the past have been verified or have been traded and what the customs therein were. Verification may also include verification of a sample object out of a group of similar objects, without verification of every object within the group. The verification process may comprise generated or received paper or electronic documents or optical data. These in turn may also be tested for authenticity. Verification may also occur when documents or reports are considered valid in relation to the object. Even marks or numbers on an object may provide information for verification purposes. This is equivalent to the goldsmith's certification of the weight and purity of a gold coin. Verification of objects may occur actively by devices like the verification device, or by people at a STORTO-facility or at locations as described earlier.

Counter fitting issues for precious metals can be greatly eliminated by using analysers. Analysers or verification devices performing part of the verification or authentication may take a testing sample or may be non-destructive to the object or to a sample of the object(s). Examples of methods are optical emission spectrometry, inductively couple plasma analysis, atomic absorption analysis, non-destructive testing, non-destructive inspection, non-destructive evaluation. A sample object may be surface tested or have its interior tested.

The administrator does not need to take full responsibility for a 100% guaranteed outcome of the process. Errors may occur or may slip through. As long as for a transfer of an ownership right the receiver is willing to receive the object(s) and accepts the verification or authentication process. It makes thus sense to have a verification and authentication process used, which is accepted (preferably in advance of a transaction) by both the provider and the receiver. A commonly used method in similar trades may help acceptation. A related party to a trade may be provided with a part of the outcome or even parts of the verification process of an object. These may also be provided out of previous trades even between other parties. This re-use of outcome or parts of verification processes lowers costs and is applicable to an object which has not left the STORTO-facility. For instance, as mentioned before, an object entering the secured space may be verified at entrance, for instance verification may be done at the object delivery entrance. Thus, the verification device may be provided at the object access of the secured space. The verification device may alternatively or additionally be located at the premises of the facility.

The STORTO-facility may have a required verification or authentication protocol, which is applicable and mandatory for some objects. This protocol may be applicable to a part or all of the actions. The protocol may take place at a STORTO-facility or at locations as described earlier. The protocol may be time-related or its execution may be time-related or may depend upon conditions at the STORTO-facility. A kind of protocol may be that only certain formats of metallic bars or coins from a limited number of manufacturers are allowed into the secured space. Another protocol may be that all delivered material is being melted again and in a secure process providing the material again to the object access at the secured space in order to get a new verification. This then may even carry a STORTO-facility related brand name or brand indication.

In an embodiment, verification is done before the object or group of objects have accessed a deposit container. More in particular, verification is done when entering the secured space in a STORTO-facility. Then potentially with standardized objects further verification or authentication for a transfer of ownership rights may not be required or requested. Examples of standardized objects are gold coins, precious metal bars etc.

This may not be applicable to items that may degenerate over time during storage. Sometimes a receiver may request additional verification. Additional verification of unique or rare objects may occur in relation to determining its value. The value of stored objects may change over time and during storage, for example the value of paintings. This verification may have to do with using other valuation methods, new insights or parts of the object that have not been examined before. People who attribute value to objects may have made a switch in views that may alter the value of that object. Valuation of unique or rare objects is different from standardized objects.

There may be no additional need to verification or authentication when trade occurs since in that process the object may not leave the secured space of a STORTO-facility. This may also be true when the object is being retrieved out of the secured space for the purpose of going out of the STORTO-facility. Some standardized objects may need only one verification and authentication process.

The computer system comprising data functionally coupling said provider to a first deposit container and said receiver to a second deposit container. In an embodiment, the computer system comprises a database comprising an indication indicating each of said deposit containers, and linked therewith holders for each of said deposit containers. In this way, the system can control the transport system to the required deposit container. The database can be stored in a memory of said computer system.

An embodiment of verification and a verification device is having a camera making video or pictures of the object in the secure area during the transportation phase of the object. For that purpose the transport system may stop the physical transport for this. The transport system may resume the transport in case additional verification by means of the camera has been accepted. In case the verification is not accepted a transfer of ownership rights does not occur and the object is stored at its previous location before getting in the transportation phase. Verification at a deposit container, or even in a deposit container, within the secured space of a STORTO-facility may be possible. Preferably, this kind of verification within the secured space occurs on a basis that does not require a human presence within the secured space.

Security may be related to the preventing or limiting of access, related to detection of intruders or related to slowing down intruders and related to fire protection amongst other aspects. Intruders may be people, devices or a combination thereof, such as a helicopter, car, drone, burglar, criminal, etc.

A secured space comprises physical access restrictions. Thus, the secured space may be restricted to certain people, but may be especially restricted for a provider or a receiver. Security applied to people may also be applicable to devices, such as to prevent drones from entering restricted parts of a STORTO-facility and within the vicinity of a STORTO-facility. The physical access restriction may occur electronically or even physically. For example a person cannot physically enter a secured space. For instance, this may be due to walls, access doors, and the like. Security may also be applicable to devices. Preventing drones from entering restricted access parts of a STORTO-facility is an example. Access for instance can be restricted due to there not being a door or passage or due to the size of the openings to an area. Some opening sizes and forms do not allow for a human or certain devices to pass through. Some openings may require specialized tools or procedures or are at a difficult to reach position. Multiple access points may need to be traversed before reaching another part of a STORTO-facility. These access points may have certain security aspects.

Shielding, hiding, compartmentalization, routing may be used for securing parts of a STORTO-facility or parts of the vicinity of a STORTO-facility. This may be executed physically or electronically or a combination thereof.

Faraday cages, chemical means or localized radiation, fences, walls, floors, obstacles, animals, robots and electronic means may all be part of security measures within and around a STORTO-facility, and be part of the physical access restrictions. These measures may limit the progress of potential intruders. Detection by video, infrared, vibration, sound and temperature may be part of intruder detection measures.

A physical disconnection between electronic systems or dedicated connections may enhance security. For instance only a certain part of a STORTO-facility can be accessed by a kind of internet-connection while other parts are not connected to a form of Internet. Usage of different and redundant data connection types may be part of a security measure, even physical thus using wireless connections or wired connections. Systems may use analogue or digital methods.

Autonomy in power supply on top of other power systems is another security measure.

Time-slots, code locks, biometric locks, cryptography etc. like being used at banks, military facilities or even depicted in movies may also be applied to security measures. Some security measures work remotely from a STORTO-facility and may work in unison with systems in a STORTO-facility.

Access or actions that may take place in or around a part of a STORTO-facility may require multiple security parts provided by different devices or parties, for instance people. This may even be executed from different physical locations. For instance accessing a deposit container may only be possible when the administrator provides one security part and the party related to the deposit container provides another security part. In addition, the computer system or a specific part of the computer system located at the facility or even located at the secured space may provide a security part or another security part. A provided security part may for instance set a device or a robot in action to perform a certain task. Cryptography methods may be used for providing or matching security parts.

In an embodiment, some actions or procedures may only require one security part. For instance peeking at or inside the deposit container by a camera may be possible by providing only one security part related to the entity controlling the deposit container. Another security part may be used for that deposit container by the administrator for also peeking at or inside the deposit container. Viewing the contents or one of the boundaries of the deposit container may be executed by a robot system equipped with a camera or even by remotely operating a camera situated near or at the rented location. This may occur separate in time from each other.

In an embodiment, some procedures or actions may require different security parts in order to complete the whole procedure. For instance accessing a deposit container for the purpose of transferring objects may require al least two authentications from for instance the provider and the receiver. The authentications may comprise keys, for instance one related to the provider and one related to the administration. In an embodiment, transport of an object from a provider to a receiver of that object may comprise at least an authentication from the provider and at least an authentication from the receiver. Additionally one or more authentications provided by the administrator may be needed. In an embodiment, transporting an object may only commence once at least the provider of the object(s), the receiver of the object(s) and the administrator have provided their authentication. The authentication may also be distributed according to or parallel to crypto-currency procedures, like for instance bitcoin. In such an embodiment, an effective authorization may comprise using multiple sources or processes that may have a distributed character. Additionally, the presence of the objects may be checked by the transport system and/or the computer system, for instance before actual handling of an object occurs. This can also be before an authentication of the trade transaction by the receiver.

Security is as strong as the weakest link in a chain. Higher security in one area may mean that within another area lower to no security may sometimes be sufficient.

Security systems may record data that may even be provided in part to related party or to the police force or to the judicial system for different purposes.

Banking facilities, power supply facilities, communication facilities, nuclear facilities are known to have various security systems. Often these security systems are publicly known, sometimes even by means of principles used in movies, principles that can be extracted out of building permits, literature or plans of such systems. An expert knows systems or methods for security. These security systems may be applied in the current trade facilitating system.

Security methods or approaches that are physical in nature may be used or be converted to an electronic version.

Security methods may be applied to the physical part of the secured place or to the physical part of a storage location within the secure area.

Maintenance, handling, operations, procedures or actions in or around a STORTO-facility may be executed by in part by one or more robot systems or different types, for example drones or autonomous vehicles comprising robotic parts.

A user of a STORTO-facility may be a related party such as a provider, receiver or renter or a combination thereof. Control of the processes which occur at the facility enhance transparency and trust for users of the STORTO-facility. This effect may even be larger when parts of processes are shared with STORTO-facility users or are even made public. For providing maintenance for instance on or in the secured space, for instance maintenance on the transport system or on one or more of the deposit containers, the trade facilitating system comprises a maintenance access to the secured place. Such a maintenance access may for instance allow access to the inside of the secured space for maintenance personal. Use of the maintenance access may be recorded by video and watched back to determine whether or not improper actions have occurred. There is a trade-off in what information to make accessible to users in order to enhance trust en transparency without providing means that may be used for planning a robbery of objects or for another criminal plot regarding a STORTO-facility and its use.

The secured space comprises deposit containers that are used for storing objects. Each vacant deposit container may for instance be rented or bought. In case no person is allowed or able to access the secured space this enhances a perception of security at a provider and/or receiver level regarding the level of security of the storage of objects.

In an embodiment, a deposit container is enclosed and has a physical part that can be opened and closed. The deposit container can for instance have walls. The deposit container in an embodiment further comprises a closure, for instance a door. This opening and closing of a deposit container may occur by entering a code on a keypad. A form of two-way or multiple-ways of communication may also be used. The deposit container may be accessed and opened by a robot system having the right access key. Such a robot system may be part of the transport system. Encryption may be part of the opening protocol of the deposit container. Opening a deposit container may be performed without the need for a key on one of the sides of the deposit container. It may be that the robot system or the computer system provides the right code to an intermediate device that actually operates the lock. Thus in an embodiment opening the deposit container occurs by the robot system. This opening by the robot system may be done in an indirect manner via an intermediate device. In case the secured space has a certain security level the deposit containers may have limited security. In case the robot system only performs the actions within the safe area unlocking the robot system for a specific task or group of tasks may be sufficient instead of securing each deposit container. An example of such a task may be related to opening and accessing a specific deposit container. The robot system may be restricted to performing only that task, for instance because it was not unlocked for other actions. In an embodiment the robot system or the transport system comprises a series of tasks that need to be authenticated separately. In an embodiment, these tasks are part of a trade or trade transaction. This may provide another form of security and this may be an additional security measure.

The invention allows for a party other than the administrator to remain in control over a stored object, since at least part of the rights relating to the contents of the deposit container remains in principle the hands of that party. In an embodiment, the administrator has no rights regarding the content of the deposit container. It thus cannot for instance lend the content to borrowers without that party that is in control of a deposit container knowing about it. In an embodiment, the administrator does not have an authorization to open and access a deposit container. This may be defined in protocols and regularly checked by third parties. The administrator only facilitates the deposit containers in the secure area of a STORTO-facility. In an embodiment, the administrator provides an additional authorization for a trade transaction, in addition to an authorization from the provider and the receiver. The administrator thus facilitates a physical part of a transaction, trade or transfer of ownership rights. The administrator is not a banker in the sense of leveraging contents of a deposit container. As explained above, the party controlling the contents of the deposit container in an embodiment has the ability to remotely look at the content situated at the deposit container. This may be limited to the robot system operating for other purposes or may be occurring within a relative short time frame in comparison to the earlier described banking facilities.

The administrator's business is renting or selling deposit container space in combination with a transaction mechanism that does not require objects to leave the STORTO-facility when trading between a provider and a receiver at a specific STORTO-facility.

In an embodiment, standardized objects are provided. This may enable trade involving STORTO-facilities. Thus for instance a provider at a first STORTO-facility may trade with a receiver at a second STORTO-facility. In that sense the administrator may be a substitution partner of standardized objects in the trade. In a secured space, for instance, the administrator may also control a number of objects that may be transported between deposit containers. In an embodiment, the administrator receives objects from a provider at one STORTO-facility, and provides a number of objects to the receiver at another STORTO-facility. Thus, for instance, the transport system at one STORTO-facility transports objects from a deposit container under the control of the provider to a deposit container under the control of the administrator, and at a second STORTO-facility the transport system of that second STORTO-facility transports objects from the deposit container that is under that control of the administrator to a deposit container that is under the control of the receiver. It is clear that such an arrangement may also be done using non-standardized objects, but thus may require more complex validation of objects. In that way the trade may occur relatively quick. Thus, the administrator may manage or have the administration over several STORTO-facilities. This may also hold for a facility having several secured spaces. In such an embodiment, for instance each secured location may be dedicated to another type of objects, for instance one secured space may be dedicated to gold, another secured space may be dedicated to art objects, and the like. The administrator then needs to have at least one surplus of objects at the second STORTO-facility. The administrator takes in the objects of trade at the first STORTO-facility and stores this as a surplus or as a trading supply. Then the administrator takes standardized objects out of a surplus at the second STORTO-facility and provides this to the receiver at the second STORTO-facility. The burden of equalizing the surplus again is then taken by the administration of the two STORTO-facilities in question. This then may require a physical transport of the standardized objects between two or more STORTO-facilities. Otherwise a physical transport without the intermediate STORTO-facilities acting as a party would have been needed and this may for instance delay the trade, amongst other problems. In case STORTO-facilities act frequently as an intermediate party for providers and receivers the outcome may even be that no physical transport between STORTO-facilities in name of the STORTO-facilities is required. When using inter-STORTO-facility trades it may be wished for that the STORTO-facilities be put under the same operation rules as it where a third party provider or a third party receiver. This enhances transparency for users of STORTO-facilities.

The administrator may provide devices, methods and electronic platforms to facilitate a provider or a receiver in their role for setting up, effectuation and managing a trade and the related aspects and possibilities of a trade or to a related storage location within a STORTO-facility.

Faults like abusively providing an object to a receiver are minimized since the receiver needs to be part of the transfer by providing authorization, for instance using one of its keys. Even the transaction, trade or transfer of ownership rights itself may need additional authorization, for instance using keys in addition to requiring authorizations for the opening and for the accessing of a deposit container. This may also be true for the execution part of the physical transfer between a first and a second deposit container.

A transaction, trade or transfer of ownership rights of a physical object occurs in a transparent manner at a safe location wherein the object(s) may have been subjected to a verification or authentication process.

A transaction, trade or transfer of ownership rights of a physical object may occur at a physical location physically while another part of the transaction, trade or transfer of ownership rights of the physical object occurs remotely or electronically. The computer system may for instance be coupled to a state of the art payment system. Thus, when a transport of objects between a provider and a receiver does not completely cover a transaction or a trade, a remaining part may be done via the state of the art payment system. Coupling of the computer system may facilitate this. The trade facilitating system may thus be a hybrid system.

The invention further pertains to a trade facilitating system based upon a physical transfer of objects, wherein for trading to take place at least one object is transferred from being under the control of a provider to being under the control of a receiver, said system comprising at least one trade facility, said facility comprising:
a secured space comprising physical access restrictions to said secured space;
a series of deposit containers inside said secured space, and a transport system inside said secured space for enabling transport of objects between deposit containers.

In an embodiment, the transport system is an automated transport system, in particular a robotised transport system.

In an embodiment, the trade system of any one of the preceding claims, wherein said trade facilitating system can preform a role of one of the provider and the receiver.

In an embodiment, said computer system receives provider input data from a series of providers and corresponding receiver input data from a series of receivers, said computer system compares said input data for calculating a series of net retrieving, transporting and depositing actions of objects from deposit containers, and controls said transport system for performing said calculated net retrieving, transporting and depositing actions.

In an embodiment, said deposit containers comprise an access restriction comprising a lock comprising a key, wherein in particular said key is operated by any one selected from said transport system, said computer system, or a combination thereof.

In an embodiment, at least one selected from said secured space and said deposit container comprises an imaging device for providing an image of the interior of a deposit container, in particular said imaging device is functionally coupled to said computer system, more in particular said computer system comprises machine instructions which cause said computer system to receive a authorization from a holder of a deposit container for an image of the interior of his deposit container from said imaging device, to verify said authorization, and to control said imaging device to supply said image of the interior of the deposit container.

In an embodiment, said a transport is provided for taking an object out of a deposit container, provided for placing an object inside a deposit container, and provided for transporting said objects within said secured space between deposit containers.

In an embodiment, the system further comprises a computer system, provided for using authorization related to said receiver, provided for using authorization related to said provider, said computer system further provided for assigning a first deposit container to said provider and assigning a second deposit container to said receiver, said computer system further provided for controlling said transport system, and said computer system further provided for controlling opening and closing of said deposit containers.

In an embodiment, said computer system is further provided for:
receiving authorization from said provider;
receiving authorization from said receiver;
receiving an indication, authorized by both the provider and the receiver, of the number of objects to be transferred, and verifying said authorizations.

In an embodiment, said computer system is further provided for:
controlling said transport system for accessing the first deposit container;
controlling the transport system for retrieving from said first deposit container the authorized number of objects;
controlling the transport system to transport the retrieved objects to the second deposit container, and
controlling said transport system for placing the retrieved objects into the second deposit container.

The invention further provides a trade facilitating system based upon a physical transfer of objects, wherein for trading to take place at least one object is transferred from being under the control of a provider to being under the control of a receiver, said system comprising at least one trade facility, said facility comprising:
 a secured space comprising physical access restrictions to said secured space;
 a series of deposit containers inside said secured space;
 a transport system inside said secured space, said transport system provided for taking an object out of a deposit container, provided for placing an object inside a deposit container, and provided for transporting said objects within said secured space between deposit containers;
 a computer system, provided for using authorization related to said receiver, provided for using authorization related to said provider, said computer system further provided for assigning a first deposit container to said provider and assigning a second deposit container to said receiver, said computer system further provided for controlling said transport system, and said computer system further provided for controlling opening and closing of said deposit containers;
wherein said computer system is further provided for:
receiving authorization from said provider;
receiving authorization from said receiver;
receiving an indication, authorized by both the provider and the receiver, of the number of objects to be transferred;
verifying said authorizations;
controlling said transport system for accessing the first deposit container;
controlling the transport system for retrieving from said first deposit container the authorized number of objects;
controlling the transport system to transport the retrieved objects to the second deposit container, and
controlling said transport system for placing the retrieved objects into the second deposit container.

The invention further pertains to a method for facilitating trade, said method comprising transferring at least one object from being under the control of a provider to being under the control of a receiver, said method comprising providing:
 at least one trade facility;
 a secured space on said trade facility and comprising physical access restrictions to said secured space;
 a series of deposit containers inside said secured space, comprising a first deposit container assigned to said provider and a second deposit container assigned to said receiver;
 a transport system inside said secured space;
 a computer system, functionally coupled to said deposit containers and to said transport system,
said method further comprising:
 said transport system retrieving an object from said first deposit container, transporting said object within said secured space from said first deposit container to said second deposit containers, and placing said object inside said second deposit container,
said method further comprising a computer system, said computer system comprising software which, when running on said computer system:
 receives an authorization from said receiver;
 receives an authorization from said provider;
 receives an indication from the provider and from the receiver of the number of objects to be transferred;
 verifies said received authorizations and said indications;
 controls said transport system and said first deposit container for retrieving from said first deposit container the authorized number of objects;
 controls transport of the retrieved objects to the second deposit container, and
 controls placement of the retrieved objects into the second deposit container.

The invention further pertains to a computer program product for facilitating trade, said method comprising transferring at least one object from being under the control of a provider to being under the control of a receiver, said computer program when running on a computer system:
 receives an authorization from said receiver;
 receives an authorization from said provider;
 receives an indication from the provider and from the receiver of the number of objects to be transferred;
 verifies said received authorizations and said indications;
 controls a transport system in a secured space and a first deposit container in said secured space for retrieving from said first deposit container the authorized number of objects;
 controls transport of the retrieved objects to a second deposit container in a secured space, and
 controls placement of the retrieved objects into the second deposit container.

The invention further pertains to currency backed by a new technology, a license agreement or Intellectual property (IP) right, like patents or trade secrets.

In an embodiment, the trade facility can at least partially be build up using elements. Suitable elements are for instance described in US2014274416, US2014274417, US2014273730 or WO2014142665. These documents are cited herein as if fully disclosed. In an embodiment, at least one selected from the deposit containers and the transport system may comprise elements according to the references cited. For instance, elements may form deposit containers. Inside the deposit container, one or more objects are kept. When an object needs to be replaced, one or more elements forming the deposit container may transport an object out of the deposit container. In an embodiment, elements form deposit containers in such a way that a space can be filled with deposit containers. Elements can displace in such a way as to provide a passage from one deposit container to another. Alternatively or in combination, elements may form a transport system. In fact, part of the elements that form a deposit container at first may become part of the transport system.

The person skilled in the art will understand the term "substantially" in this application, such as in "substantially encloses" or in "substantially extends up to". The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally", when used for instance in "functionally coupled" or "functionally direct communication", will be understood by, and be clear to, a person skilled in the art. The term "substantially" may also include embodiments with "entirely", "completely", "all", etc. Hence, in embodiments the adjective substantially may also be removed. Thus, for instance "functionally direct communication" comprises direct, live communication. It may also comprise communication that, from a perspective of the parties communication, is experienced as "live". Thus, like for instance VOIP, there may be a small amount of time between various data packages comprising digital voice data, but these amounts of time are so small that for users it seems as if there is an open communication line or telephone line available. Where applicable, the term "functionally" may also relate to 90% or higher, such as 95% or higher, especially 99% or higher, even more especially 99.5% or higher, including 100%. In fact, "functionally" is used to indicate that features relate to one another in such a way that deviations from the exact relation are possible as long as the functioning is present. When for instance computer devices are "functionally coupled", this means that they may be coupled via a wired connection, a wireless connection, and the like.

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The trade facilitating system and its elements herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to elements or parts of the trade facilitating system comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, showing an embodiment of a trade facilitating system, and showing in.

The drawings are not necessarily on scale.

DESCRIPTION OF PREFERRED EMBODIMENTS

Figure 1:
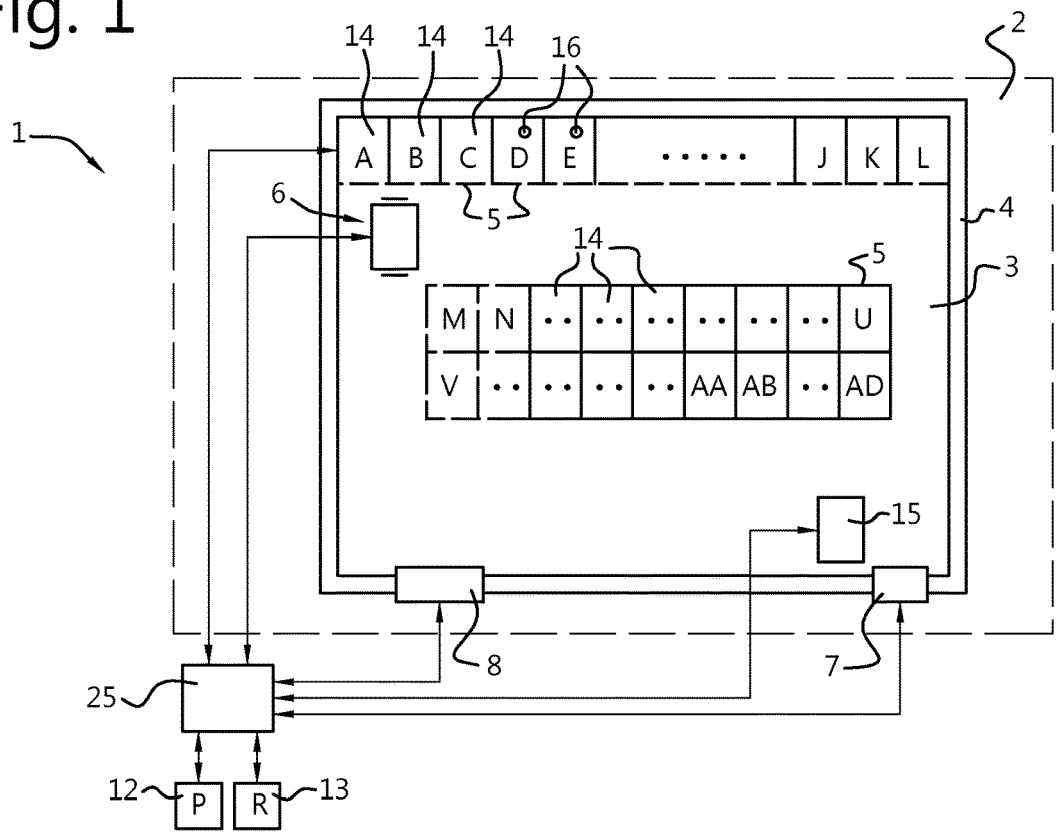
FIG. 1 a schematic overview of a trade facilitating system.

In FIG. 1, a schematic overview of an embodiment of a trade facilitating system 1 is depicted. The trade facilitating system 1 has a facility 2. On facility 2, a secured space 3 is provided that has physical access restrictions 4. In an embodiment, there may be more secured spaces at one facility.

In the secured space 3, deposit containers 14 are provided. The deposit containers 14 all have an indication. In the drawing, the deposit containers 14 subsequently have an indication A-AD. These indications do not have to be a physical indication.

In the secured space 3 a transport system 6 is provided. The transport system 6 is provided for transporting objects between deposit containers 14. Furthermore, the transport can be provided for transporting objects between deposit containers and an object access 7. This object access 7 enables for an object 16 to be entered into the secured space 3, or enables an object 16 to be removed from the secured space 3.

The secured space 3 further comprises verification device 15. In an embodiment, such a verification device is provided near the object access 7. Thus, objects 16 passing the object access 7 may be verified. The verification device 15 may for instance check the authenticity of an object 16, check the number of objects, and the like. The transport system 6 in an embodiment enables transportation of objects 16 between deposit containers 14, verification device 15 and the object access 7. In an embodiment, the transport system 6 may be provided to move freely through the secured space 3.

The secured space 3 further comprises a maintenance access 8. This maintenance access 8 enables personal or robot systems to enter the secured space 3 for maintenance purposes or for repair. The maintenance access 8 may have physical dimensions preventing access for human beings to the secured space 3.

The deposit containers 14 shown in FIG. 1 comprise a closure 5. The closure 5 can be a door. In another embodiment, a deposit container 14 may be replaced by an identifiable location within the secure area.

In FIG. 1, part of the deposit containers 14, and for some deposit containers only or also the closure 5, are indicated by means of staggered lines. This is to indicate that an enclosure of a deposit container 14 and that defines the container space does not need to be massive or does not need to completely conceal the interior of the deposit container 14. In an embodiment, the deposit container 14 has a closure 5 that is at least partially transparent. In an embodiment the closure 5 can even be at least partially open. For instance, to least part of the closure 5 may comprise gauze material. In a further embodiment, the walls defining the deposit container 14 can be at least partially transparent. In an embodiment, the walls of the deposit container 14 are at least partially open. For instance, one or more of the walls may comprise gauze material.

In FIG. 1, the computer system 25 is provided outside the facility. The computer system 25 in this embodiment in particular is functionally coupled to the deposit containers 14, functionally coupled to the transport system 6, functionally coupled to the maintenance access 8, functionally coupled to the verifying device 15 and functionally coupled to the object access 7. The provider 12 and the receiver 13 communicate with the computer system 25. In this embodiment, the administrator functionality may be incorporated into the computer system 25. In another embodiment objects passing object access 7 may not be concealed in order to prevent unwanted devices or material to enter the secure area. For example bombs or devices that enable hacking or eavesdropping are in that way prevented from entering the secure area.

Figure 2:
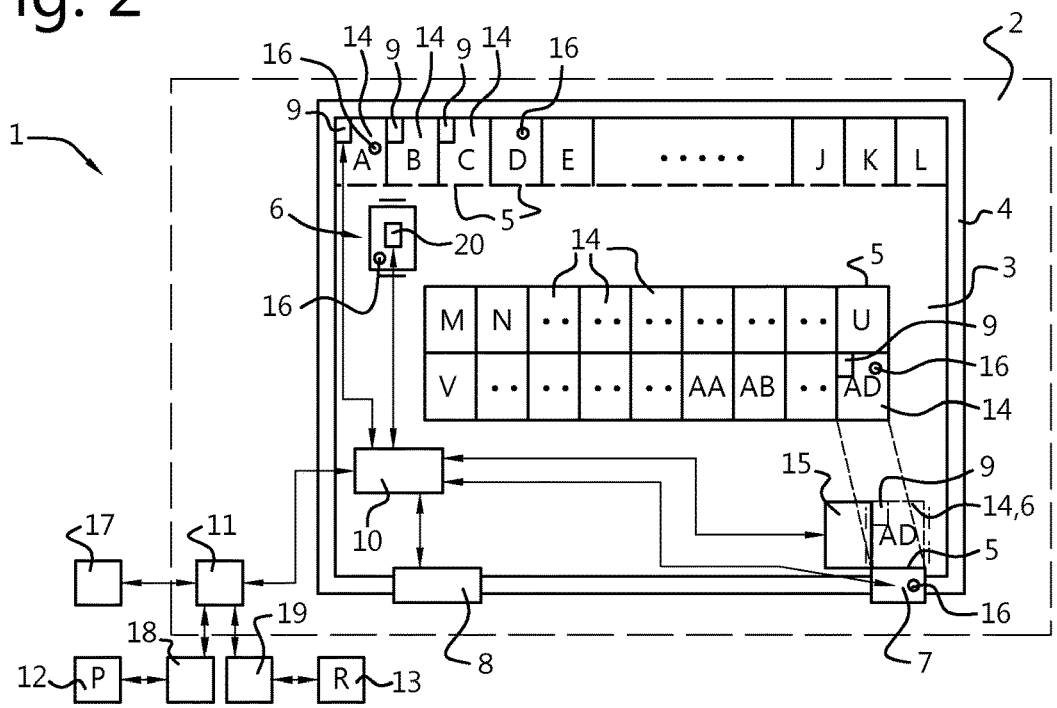
FIG. 2 a schematic overview of another trade facilitating system.

In FIG. 2, a more complex embodiment of the trade facilitating system 1 is depicted. Here, the computer system is distributed in many parts that in combination operate as computer system. Furthermore, an administrator 17 is defined separate from the computer system. In this embodiment, administrator 17 is located outside the facility 2. In another embodiment the STORTO-facility may operate without need of having the physical presence of a human being at the STORTO-facility premises. In that sense a STORTO-facility may be considered functioning automatically. The intake of objects or the retrieval of objects may also be automated, potentially in a similar way when compared to ATM's (Automated Teller Machines) used for money.

In an embodiment the STORTO-facility may use an existing facility in which the STORTO-facility houses (shop-in-a-shop principle).

In FIG. 2, the computer system is distributed in many different parts. First, the computer system comprises external computer system parts 18 and 19 that are located outside the facility. Here, the external computer system parts 18 and 19 are separately assigned for communication with the provider 12 and the receiver 13.

The computer system further comprises in this embodiment a facility computer system part 11. This part is located inside the facility. The facility computer system part 11 is functionally coupled with the administrator 17, and with the external computer system parts 17 and 18.

The facility computer system part 11 is in this embodiment functionally coupled with a secured space computer system part 10. This secured space computer system part 10 is located inside the secured space 3. In an embodiment, it may for instance be coupled to the facility computer system part 11 via a physical data connection only. This may improve security. In this embodiment, the secured space computer system part 10 is functionally coupled to the maintenance access 8, to the verifying device 15, to the object access 7, to a transport system computer system part 20, and to deposit container computer system parts 9. In this embodiment, the control over the different systems and devices in the secured space may be done by dedicated computer system parts. These dedicated computer system parts 9, 20 may be managed by the secured space computer system part 10. Some or all of the functional coupling may be physical data lines. In an embodiment, the secured space 3 is provided as a Faraday cage, preventing electromagnetic signals, in particular in the wavelength range below Infrared, from outside entering the secured space 3. This may provide additional security. It such an embodiment, functional coupling of computer system parts inside the secured space 3 may be wireless, using methods known to a skilled person.

In FIG. 2, a deposit box AD is indicated in staggered lines at object access 7. This is to indicate that in an embodiment, one or more of the deposit containers 14 can be moveable through the secured space 4. In an embodiment, the transport system 6 is moveable throughout the secured space 3, and in addition one or more deposit containers 14 are moveable throughout the secured space 3. One or more deposit containers 14 can move through the secured space under the control of at least one selected from the secured space computer system part 10, the deposit container computer system part 9, and the transport system computer system part 20, or a combination thereof. This may increase the speed at which objects can be transported between deposit containers 14. In an embodiment a deposit container 14 moves to the transport system 6, transport system 6 takes out objects 16 and the deposit container moves away to make place for another container in which transport system 6 places the objects 16. In that embodiment transport system 16 does not need to physically move itself but transfers objects in and out of deposit containers. The deposit containers then may act similar to a carrousel. In a sense, the provision for displacing the deposit container 14 or deposit containers 14 is part of the transport system 6.

Figure 3:
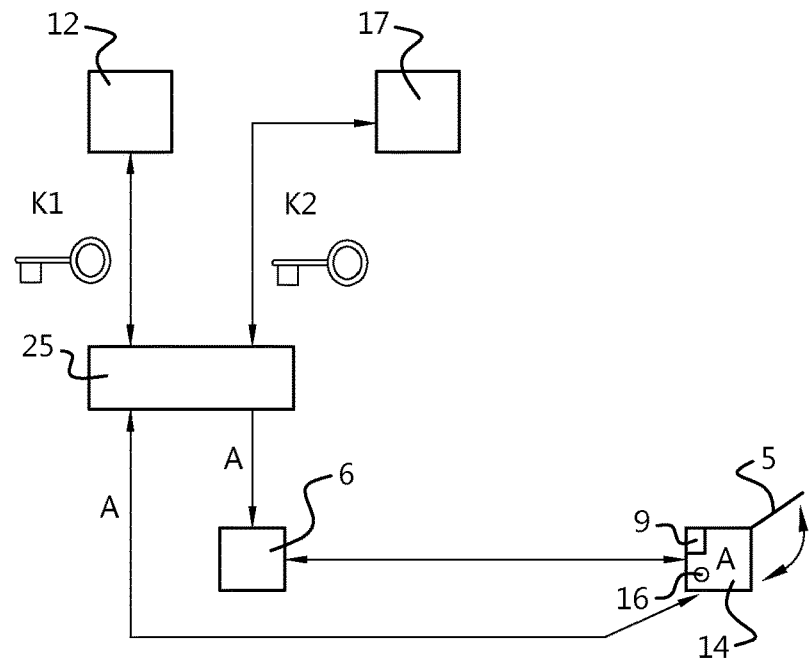
FIGS. 3-6 various steps for establishing a trade transaction.

In FIG. 3, an embodiment of a scheme for opening a deposit container 14 for a trade transaction is provided. Each of arrows between the elements depicted in FIG. 3, except for the curved arrow regarding door 5 (which depicts opening and closing), may comprise a two-way or bidirectional communication method or may comprise a single way or unidirectional communication method. This scheme may also be applicable for opening a deposit container 14 without the basis of a trade transaction. In FIG. 3, the provider 12 and administrator 17 first both provide an authorization key K1, K2 to the computer system 25. The computer system 25 now checks both authorization keys K1, K2. If both authorization keys K1, K2 are allowed, the computer system 25 generates a corresponding deposit container indication, in this case 'A', indicating the deposit container 14 that is assigned to the provider 12. The computer system 25 now sends the deposit container indication 'A' to the transport system 6 for opening the deposit container 14 with indication 'A'. The access restriction of a deposit container is indicated by 5 and can be opened and closed. Alternatively or in combination, computer system 25 sends deposit container 14 with indication 'A' a control signal for unlocking or opening its door 5. After computer system 25 has generated a deposit container indication, additional securities may be needed for opening the deposit container 14.

An authorization key may be provided using a secure network such as a VPN network connection. An authorization key may be generated by using cryptography methods and thus comprise an encryption and a decryption phase. Authorization keys may be linked to one another or may be independent of one another. Cryptography may be used in these processes for instance for secure communication, encryption of files, content protection, user authentication, digital signatures or a combination of these. Handshake protocols may establish a shared secret key by using public-key/private-key cryptography. Transmission of data using the shared secret key is used to ensure confidentiality and integrity. Commonly used cryptography principles such as symmetric ciphers, substitution ciphers, privately outsourcing computation, zero knowledge (proof of knowledge) or using prime numbers are known to the expert. A key can be used for one time or for many times; this also may be applicable to cryptography methods. The previous may also be applicable to the other figures or to other parts of the invention.

In an embodiment a message is sent to the party in control of the deposit container. This may even comprise a video or picture of a part of the deposit container 14 in addition to for example an electronic message. In an embodiment, such a message is sent in relation to an action involving said deposit container 14. For instance, opening, closing removing or placement of objects 16.

Deposit container "A" may or may not hold a corresponding number of objects 16 in relation to a potential trade transaction.

Figure 4:
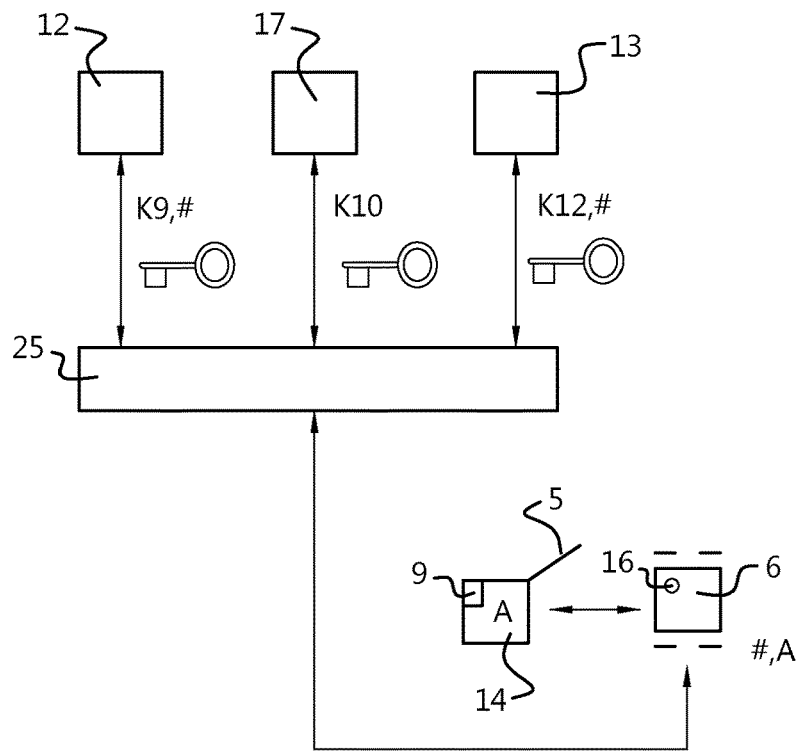

In FIG. 4, an embodiment of a scheme for transferring an object 16, part of trade transaction, from a deposit container 14 to a transport system 6 is provided. Each of the arrows between the elements depicted in FIG. 4 may comprise a two-way or bidirectional communication method or may comprise a single way or unidirectional communication method. FIG. 4 may be applicable for other purposes; in that case the actions of the receiver 13 may be omitted. In FIG. 4, the provider 12 and receiver 13 both provide an authorization key K9, K12 to the computer system 25. Additional to or part of a key is the number of objects (indicted with #) that are part of the trade transaction. The receiver and the provider have an agreed understanding; this is indicated by the '#' sign next to the key in FIG. 4. The number of objects may also comprise a certain value related to certain objects that the computer system 25 or the transport system 6 translates into the corresponding amount and type of objects for the agreed upon trade transaction. This process may be assisted by records or for instance by camera inspection at a certain stage. The computer system 25 controls the transport system 6 to take from deposit container 14 the number # of objects 16 corresponding to the agreed upon trade transaction (related to the provider) when also the administrator 17 has provided its authorization key K10 in addition to the corresponding key K9 of the provider and key K12 of the receiver and when these keys have been allowed or authenticated by the computer system 25. The computer system 25 or transport system 6 may during that process verify, or previous to that process have verified, that the corresponding objects 16 are actually available in deposit container 14. This again may be achieved by accessing historical data or by using camera data. In an embodiment, even live camera data may be used. In case the corresponding objects 16 are not available in the deposit container 14 with indication A, administrator 17 may not provide its authorization key and in that case the trade transaction is not effectuated. This withholding of the administrator key K10 may be already determined as soon as it is determined that the corresponding objects for the trade transaction are not available at the deposit container "A" of the provider 12. Again, in case historic data or a camera inspection is used, opening of deposit container "A" in the way described in FIG. 3 is not even taking place. The trade transaction may then already be aborted after the computer system 25 has received key K9 and #, even before the receiver 13 has provided K12 or # for the trade transaction. Alternatively during the verification process K10 may also be retracted by the administrator or the trade transaction is aborted by the computer system 25 or by transport system 6 in case there are not sufficient objects in deposit container "A". A retracted key may also lead to an aborted trade transaction.

An embodiment of the invention comprises the use of a camera system that is able to view the contents of the deposit container without the need for physically opening the deposit container. In that respect, in an embodiment a deposit container comprises a camera slot. In particular, the camera slot is not provided for taking out objects of a deposit container, for instance the dimensions of the camera slot are smaller than the dimensions of the objects. This embodiment may be applicable to each figure or to other parts of the invention.

In case all keys K9, K10 and K12 have been given and have been authorized by the computer system 25, computer system 25 subsequently controls the transport system 6 to take out the number of corresponding objects 16 from deposit container 14 to or onto that transport system 6. The transport system 6 can only do so when deposit container 14 is open, or when its interior is accessible.

The end situation of FIG. 4 is that the objects 16 are at the transport system. After that end situation the deposit container 14 may already be closed. This may be done by the system that opened it and may or may not require additional keys. Closing a deposit container may be automatic in case the objects for the trade transaction are at the transport system. A different situation is possible when multiple transports are executed by the transport system 6 and may be the case when the transport system 6 has a limit to the handling of a number of objects.

Figure 5:
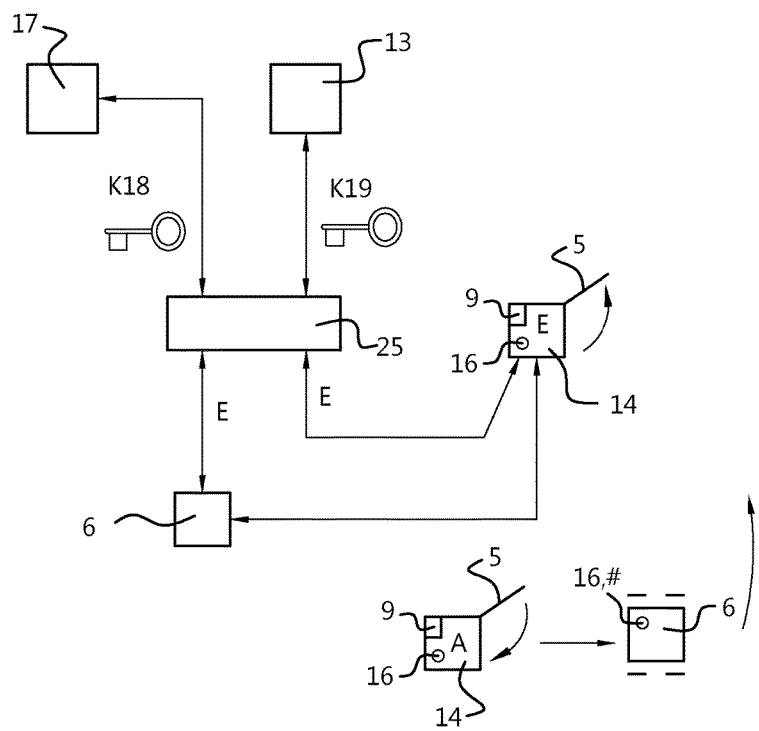

FIG. 5 provides the opening of the access restriction 5 of deposit container 14 of the receiver 13 indicated by "E" before transport system 6 can deposit the number of objects 16 into deposit container 14. Again, Each of the arrows between the elements depicted in FIG. 5, except for the curved arrows regarding doors 5 (which depicts opening and closing) and the two arrows regarding transport system 6, may comprise a two-way or bidirectional communication method or may comprise a single way or unidirectional communication method.

The computer system 25 allows the opening of deposit container "E" only after key K18 of the administrator 17 and key K19 of the receiver 13 have been received and verified. Subsequently, a process similar to the process described in FIG. 3 occurs. Opening of the deposit container 14 with indication "E" may de done or controlled by the computer system 25 or by the transport system 6 or by a combination of 25 and 6. Indicated is the transport system 6 with contents 16 and the number of objects #. When combining this figure with the previous figures it may become clear that the object 16 has come from deposit container "A" from provider 12. The opening of a receiver deposit container 14 for a trade transaction may occur at any moment before the transport system 6 transfers the objects 16 to a receiver deposit container. For instance, opening may be done at the same time when opening the provider deposit container. The closing of closure 5 of deposit container "A" is depicted in FIG. 5; this may occur at any moment after the complete physical part of the trade transaction has been executed or even be closed between parts of the trade transaction. This in case the trade transaction is has multiple transfers of objects being executed by transport system 6.

Figure 6:
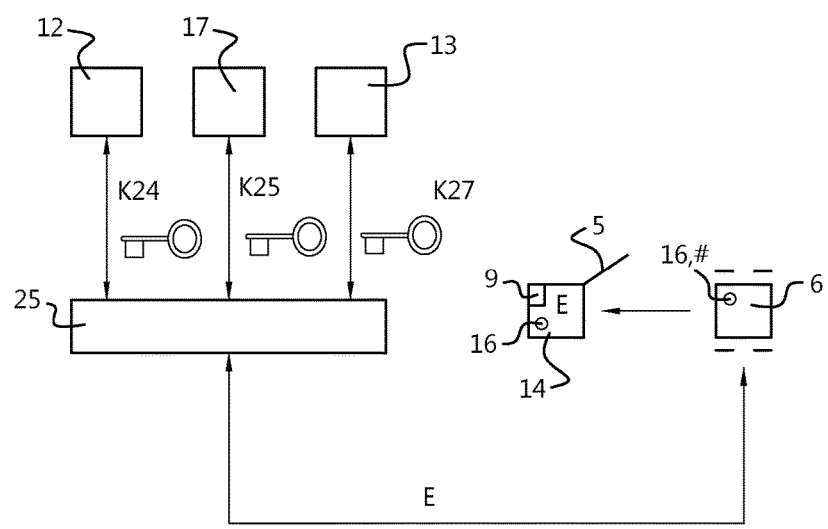

FIG. 6 provides the last part of the physical object transfer of 16 of a trade transaction wherein the number of objects # are being deposited to receiver deposit container "E". Each of the arrows between the elements depicted in FIG. 6, except for the arrow regarding transport system 6 to "E", may comprise a two-way or bidirectional communication method or may comprise a single way or unidirectional communication method. Similar aspects of previous figures may apply. In this embodiment in order to enable computer system 25 to perform this action by means of using transport system 6, several keys are required. K24, K25 and K27 received from the corresponding parties are verified in order to proceed with the trade transaction. This is another example of compartmentalization. For example a visual inspection by camera may occur before the number of objects 16, in the drawing indicated with "#", are to be transported or transferred to a deposit container 14 of the receiver 13. After a positive outcome one party, for example receiver 13, may give its authorization for continuing the trade transaction.

Other embodiments may not need these additional keys at all or may need a part of these keys for the trade transaction to complete. For instance only K27 is needed. In this figure and the previous figures various keys have been used. In an alternative embodiment, less keys can be used for more parts of the trade transaction. In another alternative, more keys may be needed. In the current computer and ICT era this should not lay additional burdens on the parties involved in the trade transaction.

It will also be clear that the above description and drawings are included to illustrate some embodiments of the invention, and not to limit the scope of protection.

Starting from this disclosure, many more embodiments will be evident to a skilled person. These embodiments are within the scope of protection and the essence of this invention and are obvious combinations of prior art techniques and the disclosure of this patent. REFERENCE NUMBERS 1 trade system
2 trade facility
3 secured space
4 physical access restriction
5 access restriction of deposit containers
6 transport system
7 object access to the secured space
8 maintenance access
9 deposit container part of computer system
10 secured space part of computer system
11 trade facility part of computer system
12 provider
13 receiver
14 deposit container
15 object authenticity checker
16 object
17 administrator
18 external part of the computer system
19 external part of the computer system
20 transport system part of the computer system
21 authorization key generator
22 authorization key verifier
25 computer system
A-AD deposit container indications
K1-Kn authorization keys
number of objects

The invention claimed is:
1. A trade facilitating system to permit a physical transfer of at least one object under the control of a provider to a control of a receiver, the trade facilitating system comprising:
at least one trade facility that includes:
a secured space having physical access restrictions
a series of deposit containers inside said secured space, including a first deposit container assigned to said provider and a second deposit container assigned to said receiver;
a transport system inside said secured space, said transport system adapted to retrieve said object out of one of said deposit container, to transport said object within said secured space between deposit containers, and to deposit said object inside a deposit container;
a computer system, adapted to subject said object to a verification process using a verification device to check authenticity of said object so as to make said object an authenticated object inside said secured space, the computer system being adapted to control said transport system in response to provider input data from said provider and receiver input data from said receiver, said computer system including data functionally coupling said provider to the first deposit container and said receiver to the second deposit container, and machine instructions which, when executed by said computer system, cause said computer system to:
subject said object to said verification process;
receive provider input data including a provider-specified quantity of objects, an authorization key from said provider to retrieve said provider-specified quantity of objects from said first deposit container, and an indication identifying said receiver;
receive receiver input data including a receiver-specified quantity of objects, an authorization key from said receiver to deposit said receiver-specified quantity of objects from said first deposit container, and an indication identifying said provider;
compare from said provider input data and from said receiver input data said quantities of objects, and said provider indicated receiver with said receiver indicated provider;
a matching provider and matching receiver, if said comparing indicates matching quantities of objects, and if an authorization for a change of ownership of said quantity of objects using distributed authentication according to or parallel to crypto-currency procedures using said authorization keys is verified, then said computer system is adapted to control the transport system: (i) for retrieving from said first deposit container the provider-specified number of authenticated objects, (ii) to transport the retrieved authenticated objects to the second deposit container, (iii) for depositing the retrieved authenticated objects into the second deposit container.
2. The trade facilitating system of claim 1, further comprising an administrator, wherein said computer system is provided for using authorization related to said administrator and receiving an authorization key from said administrator.

3. The trade facilitating system of claim 1, wherein said computer system is adapted to share one or more secrets with said receiver for generating said authorization keys, and adapted to share one or more secrets with said provider for generating said authorization keys.

4. The trade facilitating system of claim 1, wherein said computer system is further adapted to verify the availability in a deposit container of said quantity of objects to be transferred before retrieving and/or transporting.

5. The trade facilitating system of claim 1, wherein a series of different authorization codes is needed and wherein each authorization code is representative for a different part of the trade.

6. The trade facilitating system of claim 1, wherein for opening a deposit container a different authorization key is required than for use in a trade.

7. The trade facilitating system of claim 1, wherein said quantity of objects comprises at least one selected from a quantity of specifically specified objects, a quantity of standardized objects, and a combination thereof.

8. The trade facilitating system of claim 1, wherein said computer system receives an authorization code relating to a physical property or monetary value, and translates said authorization code into a quantity of objects representative of that physical property or monetary value.

9. The trade facilitating system of claim 1, wherein said deposit containers are part of said transport system.

10. The trade facilitating system of claim 1, wherein said computer system is at least partly remote from said facility, and is provided for receiving authorization remote from said facility.

11. The trade facilitating system of claim 1, wherein said secure space comprises at least one selected from walls defining said secure space, a maintenance access, an object delivery access, and a combination thereof.

12. The trade facilitating system of claim 1, wherein said deposit containers comprise a physical entrance, and an enclosure defining an enclosed space.

13. The trade facilitating system of claim 1, wherein said deposit containers comprise an access restriction comprising a lock comprising a key, wherein in particular said key is operated by any one selected from said transport system, said computer system, or a combination thereof.

14. The trade facilitating system of claim 1, wherein at least one selected from said secured space and said deposit container comprises an imaging device for providing an image of the interior of a deposit container, said imaging device being functionally coupled to said computer system, said computer system further comprising machine instructions which cause said computer system to receive an authorization from a holder of a deposit container for an image of the interior of his deposit container from said imaging device, to verify said authorization, and to control said imaging device to supply said image of the interior of the deposit container.

15. The trade facilitating system of claim 1, wherein said computer system is distributed, comprising at least one selected from a computing device provided inside a deposit container, a computing device provided inside said secured space, and a combination thereof.

16. The trade facilitating system of claim 1, wherein said computer system comprises secrets shared with said administrator, with said provider and with said receiver, wherein access to a deposit container requires an authorization of the administrator.

17. The trade facilitating system of claim 1, wherein said computer system receives provider input data from a series of providers and corresponding receiver input data from a series of receivers, said computer system adapted to compare said input data for calculating a series of net retrieving, transporting and depositing actions of objects from deposit containers, and control said transport system for performing said calculated net retrieving, transporting and depositing actions.

18. A method for facilitating trade, said method comprising:
 transferring at least one object from being under the control of a provider to being under the control of a receiver;
 providing:
  at least one trade facility comprising a secured space comprising physical access restrictions to said secured space;
  a series of deposit containers inside said secured space, including a first deposit container assigned to said provider and a second deposit container assigned to said receiver;
  a transport system inside said secured space, said transport system adapted to retrieve said object out of a deposit container, transport said object within said secured space between deposit containers, and deposit said object inside a deposit container;
  a computer system adapted to subject said object to a verification process using a verification device for checking authenticity of said object making said object an authenticated object in the secured space, and control said transport system, said computer system comprising machine instruction for causing said computer system to:
   subject said object to said verification process;
   receive provider input data including a provider-specified quantity of objects, an authorization key from said provider to retrieve said provider-specified quantity of objects from said first deposit container, and an indication identifying said receiver;
   receive receiver input data including a receiver-specified quantity of objects, an authorization key from said receiver to deposit said receiver-specified quantity of objects from said first deposit container, and an indication identifying said provider;
   compare from said provider input data and from said receiver input data said quantities of objects, and said provider indicated receiver with said receiver indicated provider;
   a matching provider and matching receiver, if said comparing indicates matching quantities of objects, and if an authorization for a change of ownership of said quantity of objects using distributed authentication according to or parallel to crypto-currency procedures using said authorization keys is verified, then said computer system is adapted to control the transport system: (i) for retrieving from said first deposit container the provider-specified number of authenticated objects; (ii) to transport the retrieved authenticated objects to the second deposit container, and (iii) for depositing the retrieved authenticated objects into the second deposit container.

19. A computer program product for facilitating trade involving transferring at least one object from being under the control of a provider to being under the control of a receiver, said computer program product comprising:

machine instructions which, when running on a computer system, causes said computer system to perform the method of claim 18.

\* \* \* \* \*